United States Patent [19]
Ohi et al.

[11] Patent Number: 5,798,589
[45] Date of Patent: Aug. 25, 1998

[54] BRUSHLESS MOTOR HAVING LUBRICATION SYSTEM FOR UPPER AND LOWER BEARINGS

[75] Inventors: Shinichi Ohi; Fuhito Umegaki; Masami Takemasa; Tatsuo Haraguchi; Yoshihide Gunji; Hiroshi Ohsawa, all of Konan, Japan

[73] Assignee: Zexel Corporation, Tokyo, Japan

[21] Appl. No.: 711,591

[22] Filed: Sep. 10, 1996

[30] Foreign Application Priority Data

Sep. 13, 1995  [JP]  Japan .................................. 7-260877
Sep. 13, 1995  [JP]  Japan .................................. 7-260879

[51] Int. Cl.$^6$ .................................. H02K 7/08; H02K 5/16
[52] U.S. Cl. .................................. 310/90; 384/136
[58] Field of Search .................................. 310/90; 384/136, 384/214, 412, 413

[56] References Cited

U.S. PATENT DOCUMENTS

| | | | |
|---|---|---|---|
| 3,932,006 | 1/1976 | Tertinek et al. | 308/187 |
| 5,041,749 | 8/1991 | Gaser et al. | 310/156 |
| 5,108,199 | 4/1992 | Dwyer | 384/136 |
| 5,610,462 | 3/1997 | Takahashi | 310/90 |

Primary Examiner—Thomas M. Dougherty
Assistant Examiner—Judson H. Jones
Attorney, Agent, or Firm—Wenderoth, Lind & Ponack

[57] ABSTRACT

The present invention offers a simple structure that facilitates the mounting of bearings, that maintains lubricating oil at a sufficient level in the bearing portions and that maintains an optimal distance between a rotor and a case housing for preventing freezing, for preventing reduction of the capacity and for preventing noise. Bearing stoppers provided between the bearings of the brushless motor and the bearing holders, which hold the upper end edge of each bearing, are secured at a projection formed at the internal circumferential surface of each bearing holder. A felt, which comes in contact with the lower portion of each bearing stopper and also comes in contact with the bearing at one side is provided, with holes communicating with the felt formed at the lower surface of the bearing stopper. In addition, the lower limit of the distance h between the lower end of the rotor and the upper end surface of the case housing is set at 1.5 mm. This prevents water from forming a connection between the rotor and the case housing due to capillary action and surface tension. In addition, the upper limit of the distance h is set at or under 8 mm, which represents the critical point for the capacity and the noise. This ensures that the capacity is maintained at a satisfactory level and also prevents noise from increasing. Moreover, a washer group, which comprises at least one each of a resin washer, a rubber washer and a POM (polyoxymethylene) washer is provided between a sensor magnet that is secured to the lower end of the rotating shaft and the lower bearing.

26 Claims, 9 Drawing Sheets

BRUSHLESS MOTOR HAVING LUBRICATION SYSTEM FOR UPPER AND LOWER BEARINGS

BACKGROUND OF THE INVENTION

1. Field of the Invention

The present invention relates to a brushless motor which is mainly used in an air blower in an air conditioning system for vehicles.

2. Description of the Related Art

Brushless motors in the prior art include the one disclosed in Japanese Unexamined Patent Publication No. H2-303345. This brushless motor is provided with a fan as an integrated part of a rotor which, having a field magnet, is provided rotatably, an armature that generates a rotating magnetic field for the fan and an excitation for exciting the armature.

In this brushless motor, a shaft (rotating shaft) is supported rotatably by bearings and is secured in the direction of the axis by a washer that comes in contact with the lower end of the upper bearing and a washer that comes in contact with the upper end of the lower bearing. In addition, the upper bearing is mounted at a portion of a casing that is formed in a bearing shape and is secured to the casing by a holding member on the opposite side, whereas the lower bearing is mounted in a portion of a bottom plate, that is shaped in a bearing shape, and is secured to the bottom plate 6 by a holding member on the opposite side.

However, the brushless motor in this example requires a considerable number of manufacturing processes for securing the bearings to the casing and the bottom plate, and there is a problem in that, since it is difficult to replenish and maintain the lubricating oil spattered from the upper bearing, the service life of the bearing is reduced.

The brushless motors in the prior art also include the one disclosed in Japanese Unexamined Utility Publication Model No. H2-139473. This brushless motor is provided with a rotor having a field magnet provided rotatably, an armature that generates a rotating magnetic field for the rotor and an excitation to excite the armature. A casing for housing the armature is further provided to waterproof the armature.

In this brushless motor, a rotating shaft is secured in the direction of the axis in such a manner that the gap between the lower end of the rotor and the upper end surface of the casing is a specific distance. To be more specific, at the lower end portion of an upper bearing and at the upper end portion of a lower bearing which, together, hold the rotating shaft rotatably, washers that come in contact with the upper bearing and the lower bearing are provided to secure the position of the rotating shaft in the direction of the axis.

With this brushless motor, since it is possible to set a narrow gap between the lower end of the rotor and the upper end surface of the case and to maintain this distance, a turbulent flow, which causes a reduction in the capacity of air supply and an increase in noise, can be prevented.

However, with this brushless motor, when the gap between the lower end of the rotor and the upper end surface of the case is set narrow, water, snow and the like, which enter along with the outside air, may adhere between the rotor and the case and become frozen, presenting a hindrance to the rotation of the brushless motor. If, on the other hand, the gap between the lower end of the rotor and the upper end surface of the case is set large, turbulent flow in the blower and a reduction in the capacity will result.

SUMMARY OF THE INVENTION

Accordingly, a first object of the present invention is to provide a brushless motor with a simple structure that facilitates the mounting of bearings and allows lubricating oil to be maintained at a sufficient level at the bearing portions.

Thus, according to the present invention, in a brushless motor comprising a rotating shaft, bearings that support the rotating shaft rotatably, bearing holders that hold the bearings, a rotor that is secured to the rotating shaft, a permanent magnet provided circularly at the rotor, a stator that generates a rotating magnetic field at the permanent magnet, an excitation coil that is wound around the stator, a control circuit board in which an excitation circuit for applying power to the excitation coil is wired and a case housing in which the control circuit board is housed, a bearing stopper is provided between each bearing and bearing holder to hold the upper end edge of the bearing, secured by a retaining claw formed on the internal circumferential surface of the bearing holder.

With this, after mounting the bearing in the bearing holder, the bearing can be held by mounting the bearing stopper at the bearing holder, making it possible to reduce the number of steps required for mounting the bearing.

In addition, according to the present invention, a felt is provided to come in contact with the lower portion of the bearing stopper with its inner surface in contact with the bearing, and in the lower surface of the bearing stopper, a hole is formed that communicates with the felt.

This allows the lubricating oil spattered from the upper end portion of the bearing in the direction of the radius to be collected in the bearing stopper and allows it to be supplied to the felt via the hole formed in the bearing stopper. As a result, lubricating oil can be replenished to the bearing through this felt, making it possible to maintain the quantity of lubricating oil at the bearing at a constant level at all times.

Moreover, an oil guide which inclines gradually downward toward the outside in the direction of the radius may be provided, for instance, at the lower end surface of a component provided at the upper portion of the bearing, i.e., a thrust stopper for holding the rotor, to reliably guide any lubricating oil that spatters in the direction of the radius to the bearing stopper.

A second object of the present invention is to provide a brushless motor in which the gap between the rotor and the case may be set and maintained at an optimal distance.

Thus, according to the present invention, in a brushless motor comprising a rotating shaft, an upper bearing and a lower bearing that hold the rotating shaft rotatably, a rotor that is secured to the rotating shaft, a permanent magnet provided circularly at the rotor, a stator that generates a rotating magnetic field at the permanent magnet, an excitation coil that is wound around the stator, a control circuit board that applies power to the excitation coil and a case housing in which the control circuit board is housed, the distance h between the lower end of the rotor and the upper end surface of the case housing is maintained within the range of 1.5 mm$\leq$h$\leq$8 mm.

By setting the lower limit of the distance h between the lower end of the rotor and the upper end surface of the case housing at 1.5 mm in this manner, it is possible to prevent a state in which water forms a connection between the rotor and the case housing due to capillary action and surface tension. By setting the upper limit of the distance h at 8 mm, which represents the critical point for capacity and noise, as indicated in the characteristics diagrams in FIGS. 10A and 10B, the capacity can be reliably maintained at a sufficient level and the noise level can be prevented from rising, thus achieving the object described above.

In addition, according to the present invention, in a brushless motor comprising a rotating shaft, an upper bearing and a lower bearing that hold the rotating shaft rotatably, a rotor that is secured to the rotating shaft, a permanent magnet provided circularly at the rotor, a stator that generates a rotating magnetic field at the permanent magnet, an excitation coil that is wound around the stator, a control circuit board that supplies power to the excitation coil and a case housing in which the control circuit board is housed, a washer group comprising at least one each of a resin washer, a rubber washer and a POM (polyoxymethylene) washer are provided between a sensor magnet, which is secured to the lower end of the rotating shaft and the lower bearing. Furthermore, the resin washer, the rubber washer and the POM washer should be sequentially placed from the lower end side of the bearing toward the sensor magnet. Moreover, it is desirable to constitute the resin washer with a nylon-based washer and to constitute the rubber washer with synthetic rubber, and in particular, with NBR (acrylonitril-butadiene rubber).

In this structure, when the position of the rotating shaft in the direction of the axis changes due to a trust force caused by thermal expansion or the like, which is applied to the washer group provided between the sensor magnet and the bearing, since the POM washer has the least frictional resistance, the POM washer becomes deformed and expands in the direction of the axis because of the frictional heat generated by the rotation of the sensor magnet which is in contact with the POM washer at its side surface. As a result, it is possible to maintain the position of the rotating shaft in the direction of the axis, thereby achieving the object described above.

Moreover, according to the present invention, the sensor magnet mounted at the lower end of the rotating shaft is secured onto the lower end of the rotating shaft with a push nut.

This makes it possible to prevent the sensor magnet from slipping, and to prevent misalignment of the rotating shaft in the direction of the axis caused by sensor magnet slippage, thereby achieving the object described above.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

Figure 1:
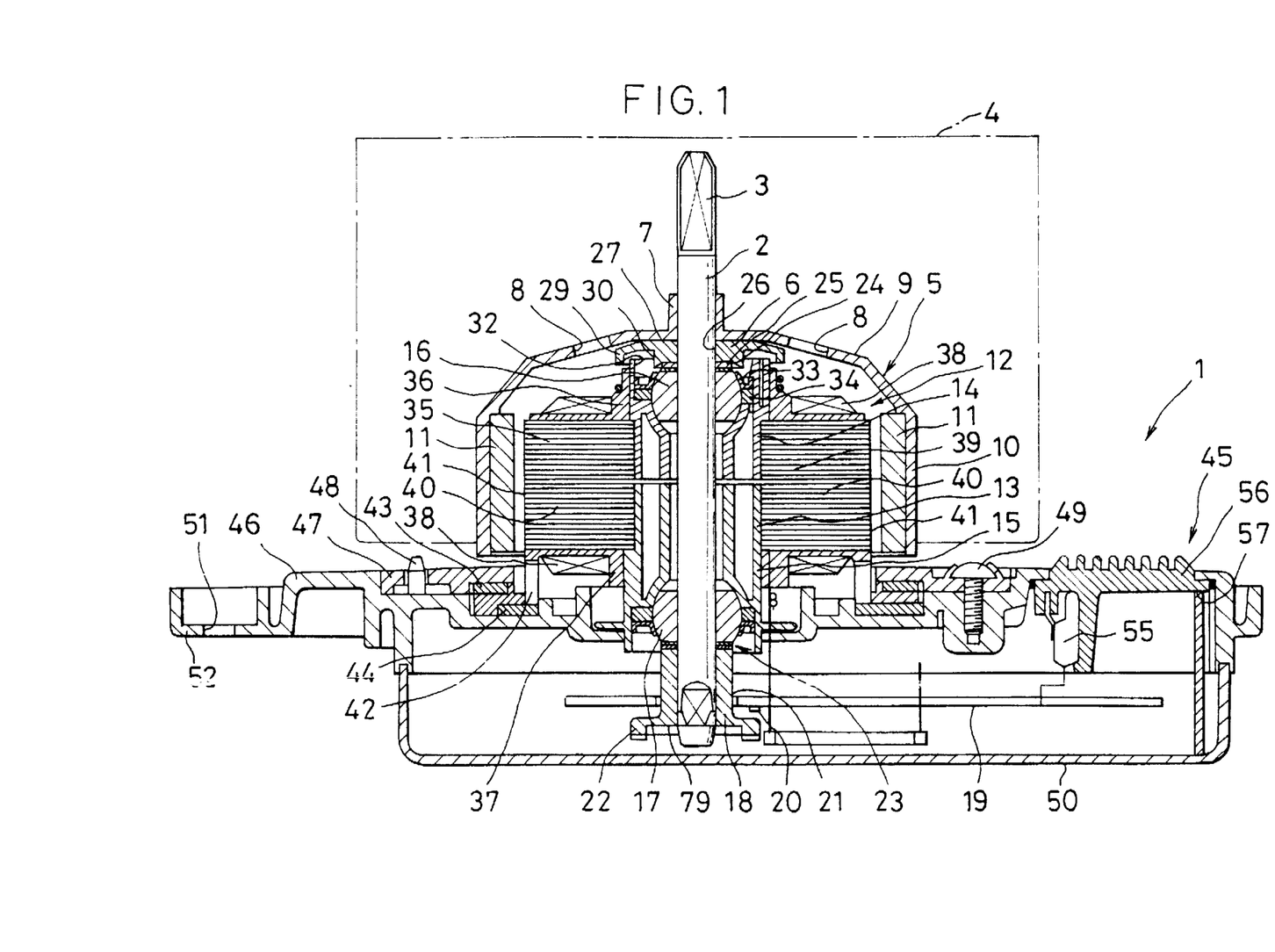
FIG. 1 is a cross sectional view of the brushless motor according to the present invention.
Figure 2:
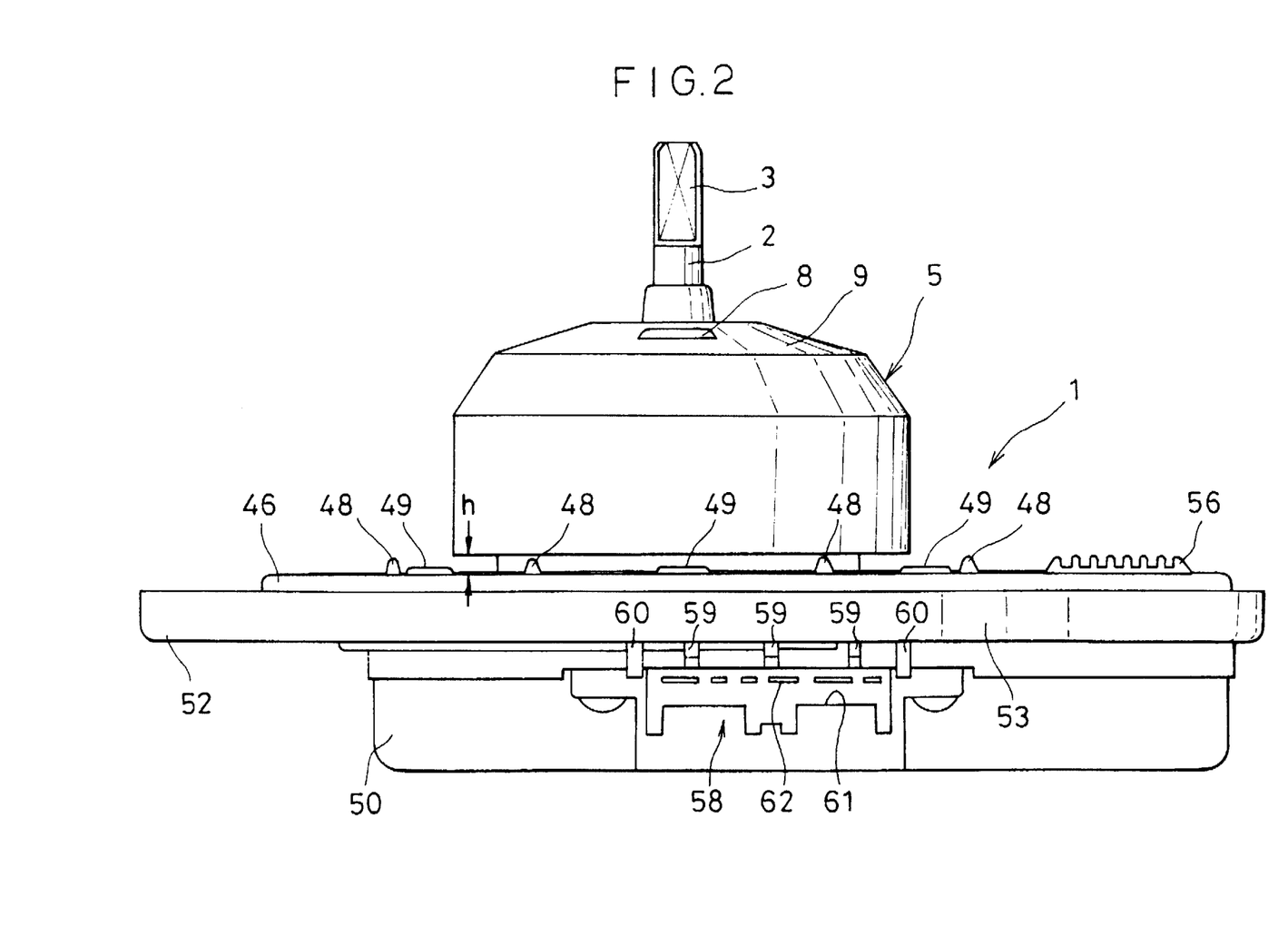
FIG. 2 is a side elevation of the brushless motor according to the present invention.
Figure 3:
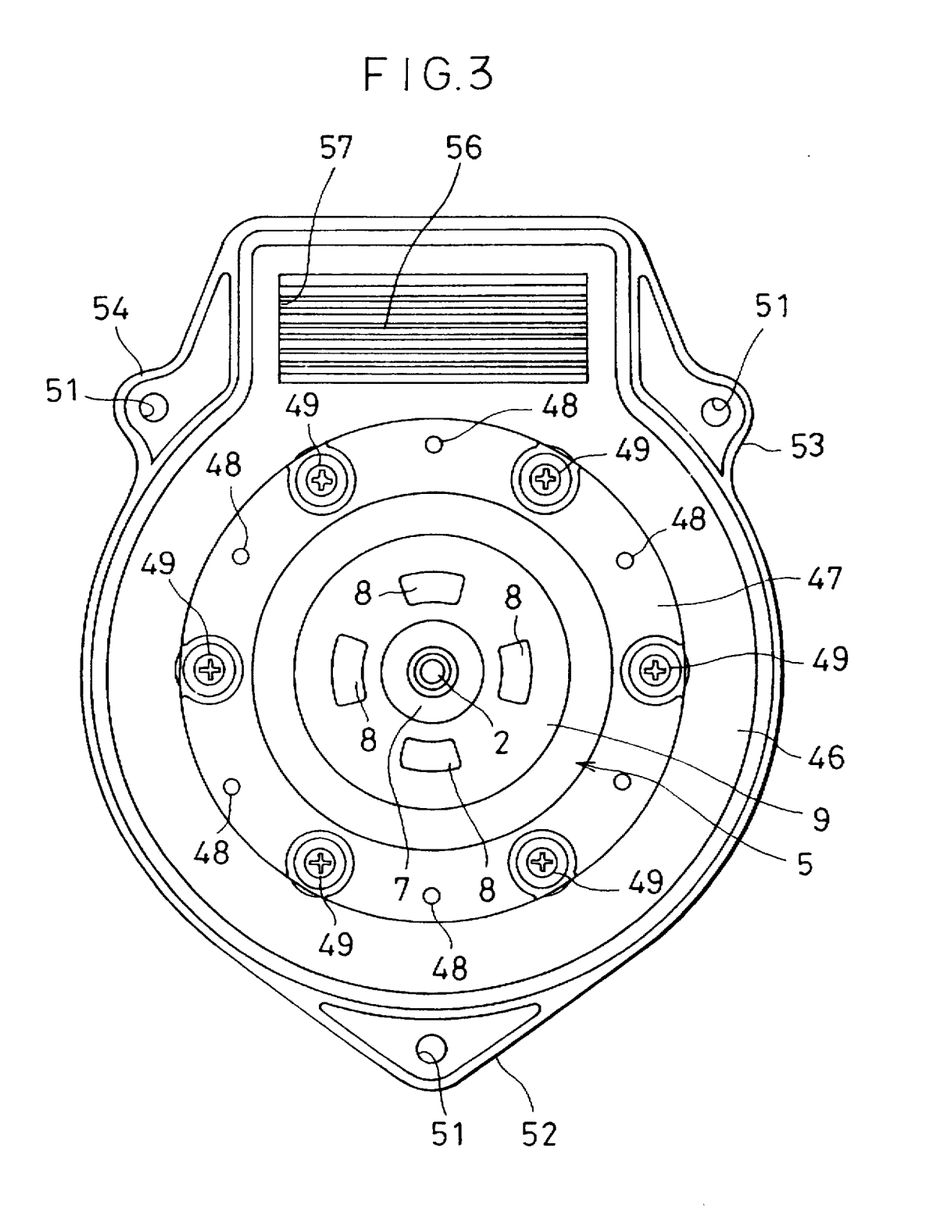
FIG. 3 is a plan view of the brushless motor according to the present invention.

The brushless motor shown in FIGS. 1 through 3 is used for the air blower in an air conditioning system for vehicles, for instance, and a scirocco type fan 4 is secured to a mounting portion 3 formed at the upper end of a rotating shaft 2. In addition, a rotor 5 is secured by press fitting to the rotating shaft 2 and is supported by a thrust stopper 6 in the direction of the axis.

Figure 4:
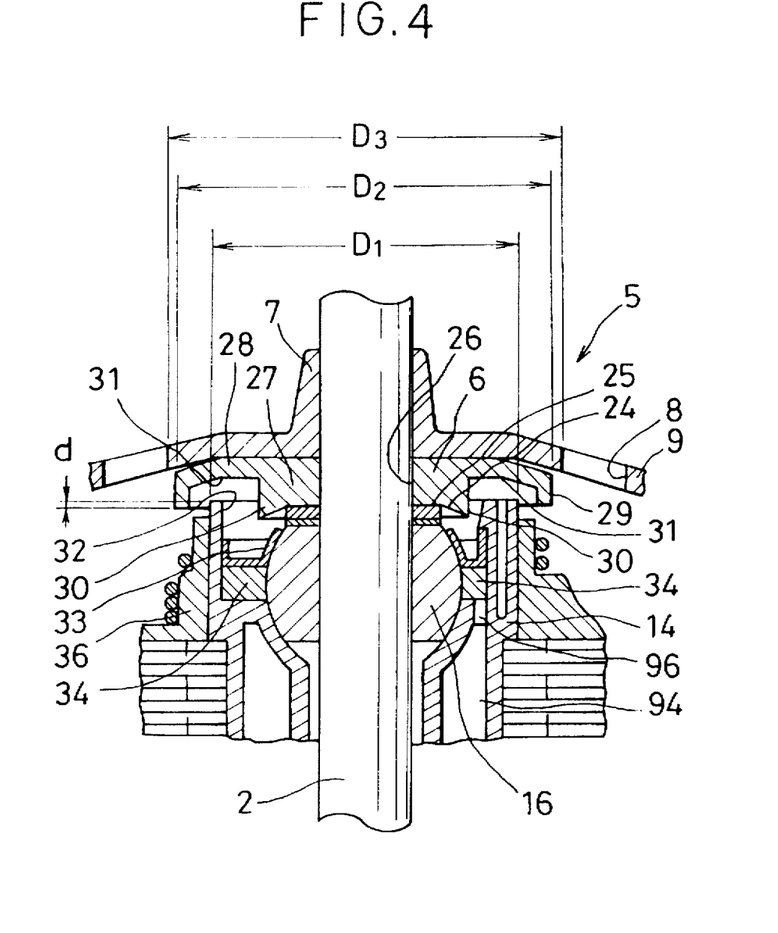
FIG. 4 is an enlarged partial cross section of the brushless motor according to the present invention.

The rotor 5 is constituted of a hub portion 7 which is secured by press fitting onto the rotating shaft 2, an umbrella portion 9 which spreads in an umbrella shape from the hub portion 7 and a cylindrical portion 10 which extends out downward from the outermost edge of the umbrella portion 9, with a plurality of permanent magnets 11 provided on the internal circumferential side surface of the cylindrical portion 10. In this embodiment, there are four permanent magnets 11 provided on the internal circumferential side surface of the cylindrical portion 10 in such a manner that their polarities are alternated. In addition, a plurality of vent holes 8 (four vent holes in this embodiment) are formed at the umbrella portion 9, with the distance between the inner sides of the two vent holes 8 which are positioned facing opposite each other set at $D_3$, as shown in FIG. 4.

The distance h between the lower end of the rotor 5 and the upper end surface of a case housing 45, which is to be detailed later, is set within a range of 1.8 mm~8 mm in order to prevent the lower end of the rotor 5 and the upper end surface of the case housing 45 from becoming connected by water and to prevent a problem caused by turbulent flow, which occurs when the rotor 5 is rotating. Note that the lower limit of the distance h between the rotor 5 and the upper end surface of the case housing 45 is set at a value that represents the threshold where water is prevented from forming a connection between the rotor 5 and the case housing 45 due to capillary action and surface tension, i.e., at 1.5 mm, to be specific.

Figure 10A:
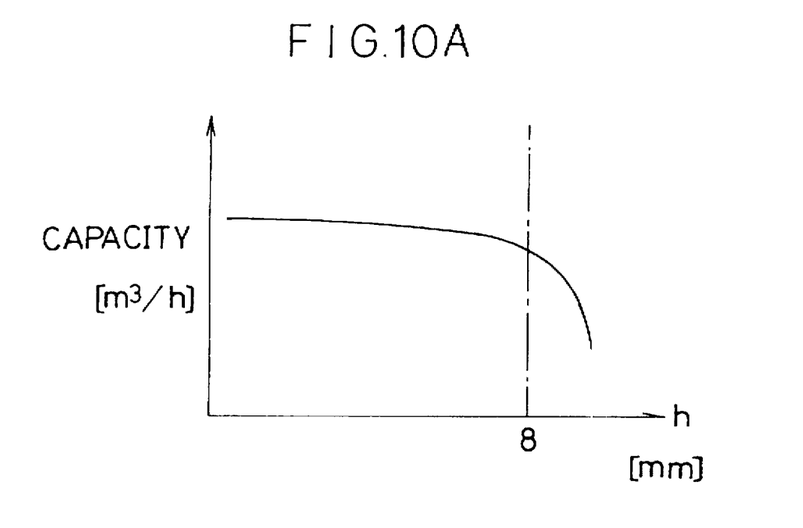
FIG. 10A is a characteristics diagram showing the relationship between the distance h between the rotor and the upper end surface of the case housing and the capacity.
Figure 10B:
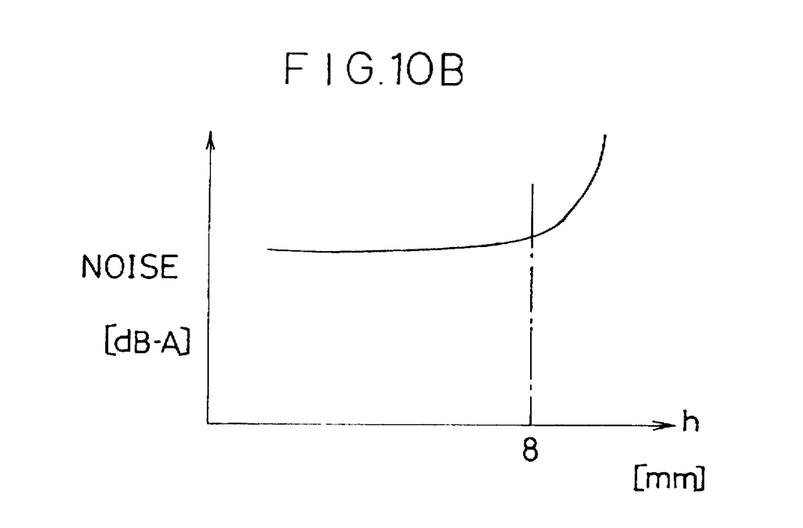
FIG. 10B is a characteristics diagram showing the relationship between the distance h between the rotor and the upper end surface of the case housing and the noise.

In addition, the upper limit of the distance h is set at the critical point of 8 mm based upon the relationship between the distance h and the capacity ($m^3/h$) shown in FIG. 10A and the relationship between the distance h and the noise (dB -A) shown in FIG. 10B. This takes into consideration the fact that if the upper limit of the distance h is set at or over the critical point 8 mm, the air that is blown out by the fan 4 enters the inside of the fan 4 via the area between the rotor 5 and the case housing 45, causing a turbulent flow of the discharged air in the vicinity of the outside of the fan 4. As shown in FIG. 10A, with the distance h exceeding the critical point 8 mm, this turbulent flow causes the capacity of the air delivered by the fan to decrease rapidly and, as shown in FIG. 10B, with the distance h exceeding the critical point 8 mm, the noise increases drastically.

The rotating shaft 2 is held rotatably by bearings 16 and 17. These bearings 16 and 17 are secured to an upper bearing holder 14 and a lower bearing holder 15 respectively, which are mounted at a through hole 13 formed passing through the center of a stator 12 which is to be detailed below. Also, at the lower end of the rotating shaft 2, a sensor magnet 18, for indicating the positions of the permanent magnets 11 at the rotor 5, is press fitted and held in the direction of the axis of the rotating shaft 2 by a push nut 79. With this, the distance between the sensor magnet 18 and a plurality of Hall elements 20 mounted at the control circuit board 19 is maintained at a constant distance.

The sensor magnet 18 is mounted onto the rotating shaft 2 by passing through an opening portion 21 formed in the control circuit board 19, and a flange portion 22 is formed at an end of the sensor magnet 18, spreading in the direction of the radius below the control circuit board 19. In addition, the plurality of Hall elements 20 are provided at positions that face opposite the flange portion 22, at the rear of the control circuit board 19 so that the positions of the permanent magnets 11 in the rotor 5 can be accurately detected by detecting the magnetism of the sensor magnet 18. Thus, based upon the results of the detection performed by the Hall elements 20, a rotating magnetic field is generated at the stator 12 by the excitation circuit wired onto the control circuit board 19.

The stator 12 is constituted with a stator core 35 formed by laminating silicon steel plates over a plurality of levels, an upper insulating cover 36 and a lower insulating cover 37, which are mounted to enclose the stator core 35 from above and below, and an excitation coil 38 which is wound around the stator core 35. The stator core is insulated by the upper and lower insulating covers 36 and 37. Note that the stator core 35 is constituted with the through hole 13 at the center of which the bearing holders 14 and 15 are mounted, a coil winding portion 40 which extends out in 6 directions from a circumferential wall 39, which defines the through hole 13 and a magnetic pole surface 41 provided continuously to the coil winding portion 40, which is formed in an arc to correspond to the rotating circle of the permanent magnets 11 at the rotor 5. It is to be noted that in this embodiment, the excitation coil 38 is delta connected.

In the brushless motor 1 structured as described above, the excitation circuit wired onto the control circuit board 19 generates a correct rotating magnetic field at the stator 12 relative to the position of the sensor magnet 18 detected by the Hall elements 20, i.e., the positions of the permanent magnets at the rotor 5, and the rotor 5 is caused to rotate by this rotating magnetic field.

The lower insulating cover 37 is provided with 6 leg portions 42 that extend out radially. The front ends of these leg portions 42 are secured by being held between an upper case member 46 and a lid body 47, which constitute part of the case housing 45, via elastic members 43 and 44. This prevents vibration in the stator 12 from being communicated to the case housing 45, since it is absorbed by the elastic members 43 and 44, eliminating one of the causes of noise. Note that the lid body 47 is positioned by lugs 48 and is secured by screws 49.

The case housing 45 is constituted with the upper case member 46, a lower case member 50 and the lid body 47 with the control circuit board 19 mentioned earlier inside. In the upper case member 46, mounting portions 52, 53 and 54 are formed, each of which is provided with a screw hole 51 for mounting the brushless motor 1 onto, for instance, an air blower unit. An opening portion 57 is also formed in the upper case member 46, through which a heat discharge plate 56 is exposed for cooling. A plurality of field effect transistors (FET) 55 are mounted at the heat discharge plate 56 and connected to the control circuit board 19.

Moreover, at a side of the case housing 45, a connector mounting portion 58, at which a source connector (not shown) is mounted, is constituted with a side portion of the upper case member 46 and a side portion of the lower case member 50 by partitioning. This connector mounting portion 58 is constituted with a plurality of upper guide lugs 59 formed at a side of the upper case member 46, a pair of guide lugs 60, one on either side of the lugs 59, and a connector mounting hole 61 formed at a side portion of the lower case member 50. At the connector mounting hole 61, a plurality of terminals 62 to be connected to the control circuit board 19 project out. Thus, when mounting the source connector at the connector mounting portion 58, it is possible to restrict the position of the source connector at the upper side and also at the two lateral sides with the upper guide lugs 59 and the guide lugs 60 on the two sides, facilitating mounting of the connector, which must be performed as a blind operation.

Figure 5:
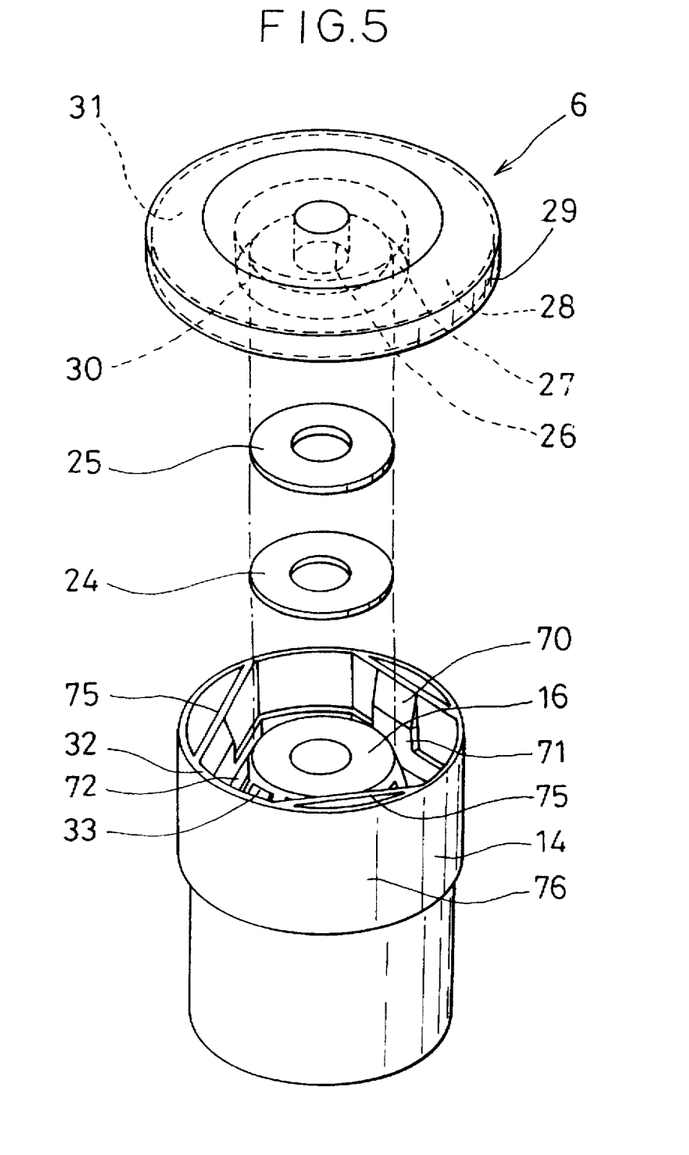
FIG. 5 is an exploded perspective of the thrust stopper and the bearing holder.

As shown in FIGS. 4 and 5, the thrust stopper 6 supports the rotor 5 in the direction of the axis with a nylon-based washer 24 and a washer 25 constituted of NBR rubber provided between the thrust stopper 6 and the bearing 16 to reduce the sliding resistance generated between the thrust stopper 6 and the bearing 16. The thrust stopper 6 is constituted with a through hole 26 through which the rotating shaft 2 passes, a cylindrical portion 27 provided around the through hole 26 and a disk plate portion 28 that expands in the direction of the radius along the umbrella portion 15 of the rotor 5 starting from the upper end of the cylindrical portion 27. Note that the external diameter of the disk plate portion 28 is set at $D_2$.

A circumferential wall 29 extending downward over a specific width is formed at the external circumferential edge of the disk plate portion 28. In addition, an oil guide 30, which is inclined gradually downward toward the outside in the direction of the radius from the flat surface where it slides in contact against the washer 25, is formed at the lower end surface of the cylindrical portion 27. A circular indented portion 31 is formed between the outer end of the oil guide 30 in the direction of the radius and the inner surface of the circumferential wall 29 so that a thrust stopper side opening portion (upper opening end) 32 of the upper bearing holder 14 enters within the circular indented portion 31 by a specific distance d.

The diameter of the upper opening end 32 of the bearing holder 14 is set at $D_1$ and the bearing 16, which is secured by the bearing stopper 33, is provided inside the bearing holder 14. On the external circumferential surface of the bearing 16 at approximately the center in the direction of the axis, a felt 34, permeated with lubricating oil, is in contact so that lubricating oil can be supplied to the bearing 16 which is constituted of a sintered metal.

As has been explained, since the distance $D_3$ between the inner sides of the vent holes 8 facing opposite each other in the direction of the radius is set larger than the diameter $D_2$ of the thrust stopper 6, and the diameter $D_2$ of the thrust stopper 6 is set larger than the diameter $D_1$ of the upper opening end 32 of the bearing holder 14, dust entering through the vent holes 8 is blocked by the thrust stopper 6 and is prevented from reaching the bearing 16 or the sliding portion where the bearing 16 and the rotating shaft 2 slide against each other. Furthermore, since the upper opening end 32 of the upper bearing holder 14 is inside the circular indented portion 31 of the thrust stopper 6 by the specific distance d, the bearing 16 and the sliding portion where the bearing 16 and the rotating shaft 2 side against each other can be isolated from the path through which dust enters. With this, problems caused by dust collecting at the bearing 16 are eliminated and the service life of the bearing 16 is extended.

Figure 6:
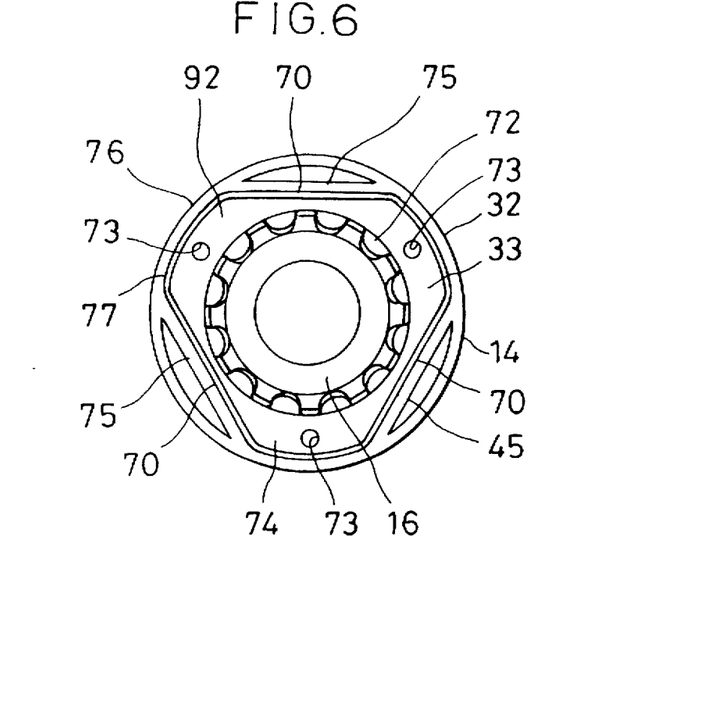
FIG. 6 is a partial plan view of the bearing holder portion in which the bearing stopper is mounted.
Figure 7:
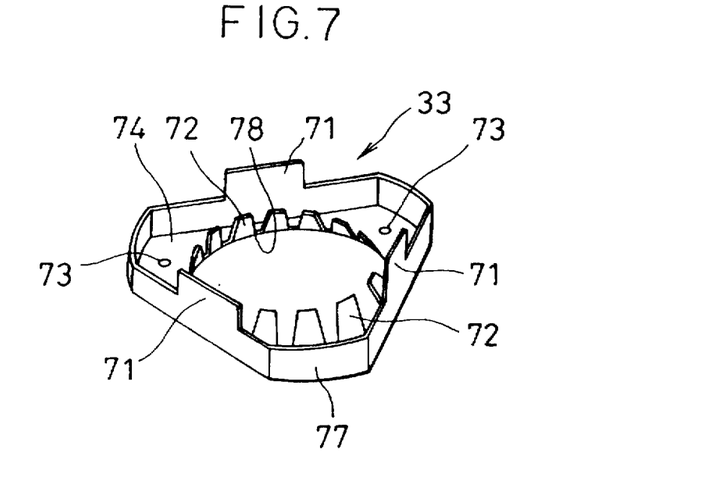
FIG. 7 is a perspective view of the bearing stopper.

As shown in FIGS. 6 and 7, the bearing stopper 33 is constituted with a bottom plate portion 74 that secures the felt 34 when it is mounted, a circumferential wall portion 77 provided erect around the bottom plate portion 74, which is in contact with circumferential walls 76 provided at 3 locations between inner walls 75 and is also in contact with the three inner walls 75, an opening portion 78 that opens at the center of the bottom plate portion 74 and a plurality of bearing retainers 72 prepared by being cut and bent to project upward around the periphery of the opening portion 78. In addition, at the upper ends of the portions of the circumferential wall portion 77 that come in contact with the inner walls 75, retaining pieces 71, which project out over a specific width, are formed and also communicating holes 73, which communicate with the felt 34, are provided by punching at specific positions of the bottom plate 74. It is to be noted that an interlocking claw 70, which projects out at the upper end to a specific position by gradually inclining with its rearmost end vertically erect at the inner side surface, is formed at the inner side surface of each internal wall 75.

When mounting the bearing stopper 33 structured as described above at the bearing holder 14, the bearing stopper 33 is pressed downward in the direction of the axis of the bearing holder 14 to fit the retaining piece 71 into the lower end of the interlocking claw 70. With this, the bearing 16 can be secured to the bearing holder 14.

In the structure described above, lubricating oil that is spattered in the radial direction due to the rotation of the washers 24 and 25 flows along the oil guide 30 formed at the lower end surface of the thrust stopper 6 and is then collected in the area enclosed by the bottom plate portion 74 and the circumferential wall portions 77. The lubricating oil thus collected on the bearing stopper 33 then travels through the through holes 73 punched in the bottom plate portion 74 to permeate the felt 34 and is supplied to the bearing 16 from the felt 34. In this manner, since a circulating path of lubricating oil is constituted with the bearing 16, the sliding contact surface of the bearing 16 and the rotating shaft 2, the washers 24 and 25, the oil guide 30, the bearing stopper 33 and the felt 34, the quantity of lubricating oil supplied to the bearing 16 can be maintained at a constant level, achieving an increase in the service life of the bearing 16.

Consequently, according to the present invention, with the stopper provided between the bearing and the bearing holder for holding the upper end edge of the bearing, which is secured by the retainer formed at the internal circumferential surface of the bearing holder, the bearing can be held by mounting the bearing stopper at the bearing holder after the bearing is mounted at the bearing holder, making it possible to reduce the number of steps required for mounting the bearing.

Moreover, with the felt provided in contact with the lower portion of the bearing stopper and the bearing at one side and the holes communicating with the felt formed in the lower surface of the bearing stopper, lubricating oil that spatters in the direction of the radius from the upper end of the bearing is collected on the bearing stopper and the lubricating oil is supplied to the felt via the holes formed at the bearing stopper, thereby making it possible to replenish lubricating oil at the bearing to a satisfactory degree via this felt and also making it possible to maintain the quantity of lubricating oil at the bearing at a constant level at all times.

Figure 8:
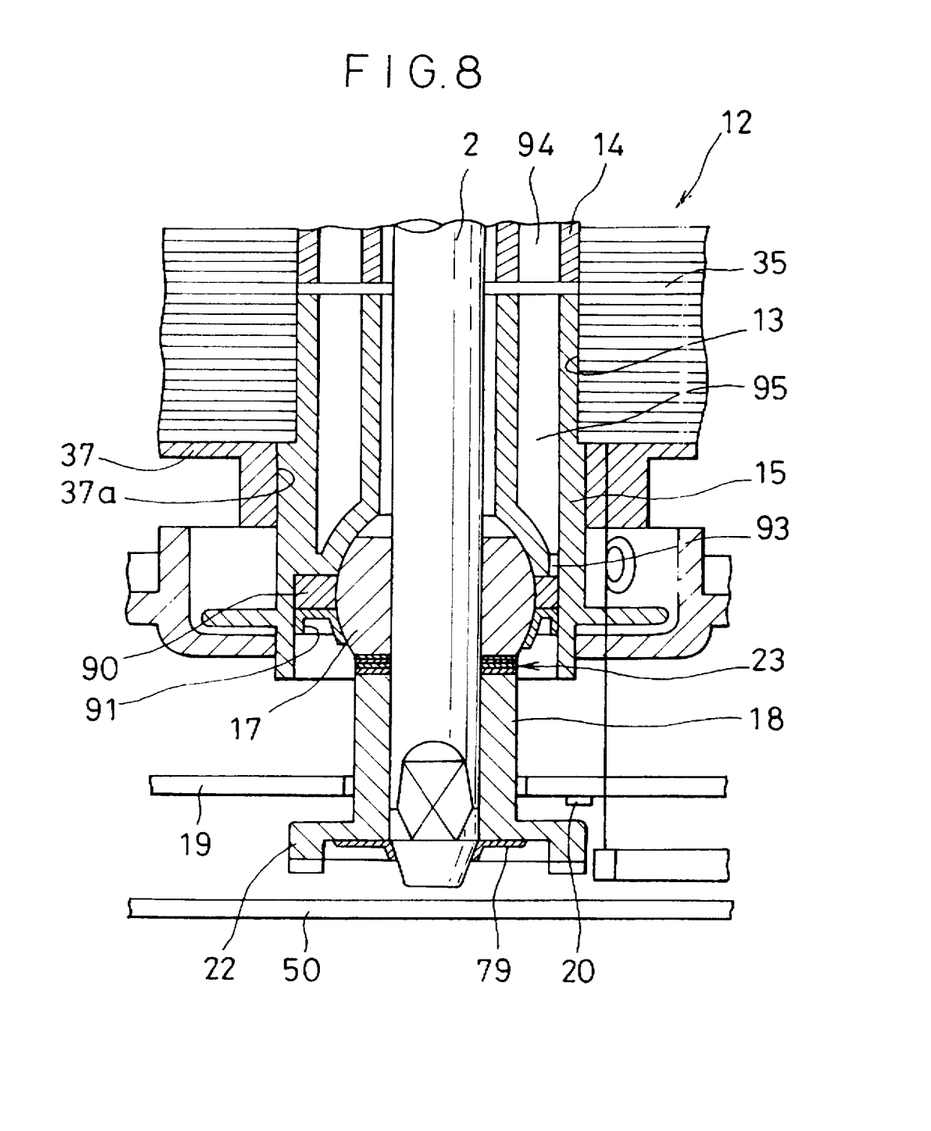
FIG. 8 is an enlarged partial cross section of the vicinity of the lower portion of the brushless motor according to the present invention.

As shown in FIG. 8, the lower bearing holder 15 is mounted in the through hole 13 of the stator 12 and a through hole 37a formed through the bottom of the lower insulating cover 37 with the lower bearing 17 secured at the lower portion on the inside by a bearing stopper 91. In addition, a felt 90, the inside of which comes in contact with the bearing 17, is held within the bearing holder 15 by the bearing stopper 91. The supply of lubricating oil to this felt 90 is achieved as follows: lubricating oil that has permeated the upper felt 34, as explained earlier, then travels through a hole 96 opening at the upper bearing holder 14 and drops into a space 94 and a space 95 at the lower bearing 15, or it flows downward along the inner wall to reach the lower felt 90 from a hole 93 formed in the lower bearing holder 15. With this, a sufficient quantity of lubricating oil is supplied to the lower felt 90, too, and the lower bearing 17 can be lubricated in a stable manner as well.

Figure 9:
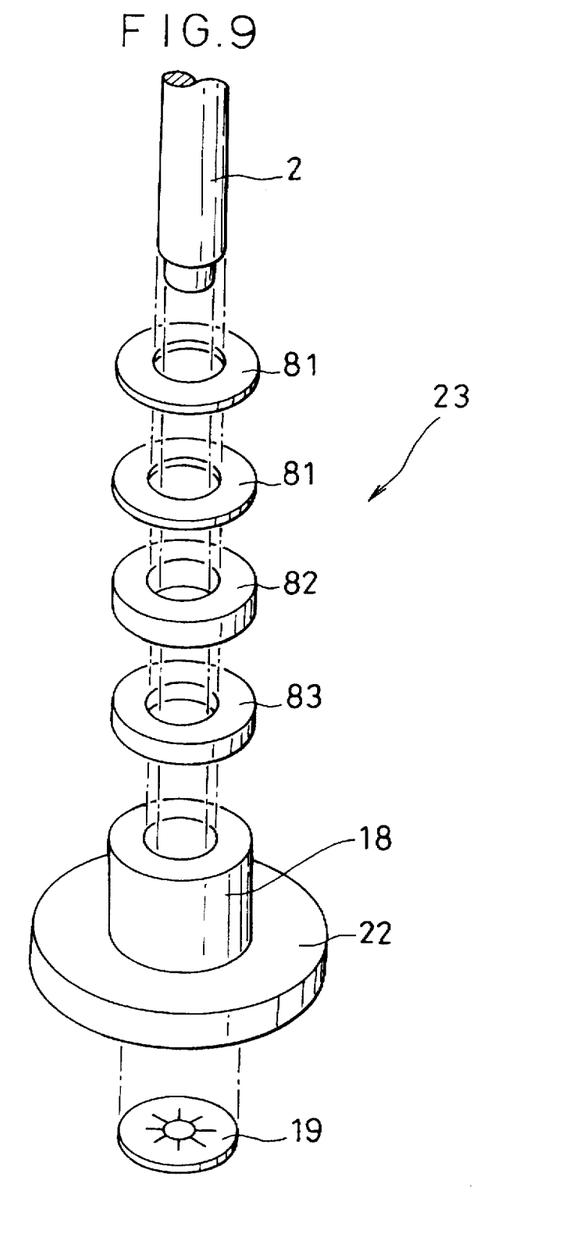
FIG. 9 is an exploded perspective view of the washer group in the present invention.

Furthermore, FIG. 9 shows a washer group 23 that is provided between the bearing 17 and the sensor magnet 18. This washer group 23 is constituted with washers 81 (nylon washers) constituted of a synthetic resin and, in particular, constituted of a nylon-based resin, a washer 82 (rubber washer) constituted of synthetic rubber and, in particular, constituted of NBR (acrylonitril-butadiene rubber) and a washer 83 (POM washer) constituted of POM (polyoxymethylene), which are provided sequentially starting from the bearing 17 side. It is to be noted that in this embodiment, two nylon washers 81 are provided.

Normally, the washer group 23 is provided between the bearing 17 and the sensor magnet 18 in a state in which no special pressure is applied in the direction of the axis and it absorbs the rotation of the sensor magnet 18 to provide a smooth transition between the stationary bearing 17 and the rotating sensor magnet 18 so that the slidability of the end portion of the bearing 17 and the end portion of the sensor magnet 18 can be improved.

However, if parts such as the bearing holder 15 and the like become thermally expanded due to heat generated at the stator, frictional heat generated from the sliding surfaces at various parts and the like, a thrust force will act to clamp the washer group 23, reducing the distance between the bearing 17 and the sensor magnet 18. This affects the distance h between the lower end of the rotor 5 and the upper end surface of the case housing 45, which may, in turn, result in the distance h deviating from the set range (1.5 mm$\leq$h$\leq$8 mm) explained earlier. In order to avoid this, the present invention employs the POM washer 83 to constitute a portion of the washer group 23. The polyoxymethylene (POM), which is the raw material for constituting this POM washer 83, is prepared by performing acetylation treatment on the end of a polyacetal piece and then by stabilizing it, and demonstrates outstanding oil resistance, water resistance and chemical resistance. Furthermore, it is strong, with a high thermal deformation temperature and a low coefficient of sliding friction.

Because of this, if the thrust force applied to the washer group 23 is only temporary, the rotation of the sensor magnet 18 is absorbed by the contact portions of the POM washer 83, which has the lowest coefficient of friction in the washer group 23 pressed between the bearing 17 and the sensor magnet 18 and the upper end of the sensor magnet 18 sliding against each other, canceling out the thrust force and, at the same time, re-setting the operation to a normal state.

However, if the thrust force applied to the washer group 23 is continuous, the temperature in the sliding area between the POM washer 83 and the sensor magnet 18 gradually rises and finally exceeds the critical temperature of the POM washer 83. In that case, the POM washer 83 will become deformed due to the heat at the sliding area and will expand, and the force will be applied in the direction in which the distance between the bearing 17 and the sensor magnet 18 increases, making it possible to maintain the distance between the bearing 17 and the sensor magnet 18. Thus, the misalignment of the rotating shaft 2 in the direction of the axis can be prevented and the gap h between the rotor 5 and the upper end surface of the case housing 45 can be maintained at a constant distance. In addition, since the contact surface of the POM washer 83 slides, the resin washers 81 can be prevented from rotating relative to the bearing 17, thereby preventing seizure caused by the frictional heat generated when the resin washers 81 rotate relative to the bearing 17 while sliding and also preventing the rotating shaft 2 from becoming locked.

As has been explained, according to the present invention, with the gap h between the lower end of the rotor and the upper end surface of the case housing in a brushless motor set within a range of $1.5 \text{ mm} \leq h \leq 8 \text{ mm}$, it is possible to prevent water from creating a connected state between the rotor and the case housing due to capillary action and surface tension and, since the upper limit of the gap h is set at or below 8 mm, the critical point for the capacity and noise, a sufficient level of capacity can be assured and, at the same time, noise can be prevented from increasing.

Moreover, according to the present invention, a washer group constituted with at least one each of a resin washer, a rubber washer and a POM (polyoxymethylene) washer is provided between the sensor magnet which is secured to the lower end of the rotating shaft and the lower bearing. This ensures that when a specific pressure is applied in the direction of the axis of the washer group provided between the sensor magnet and the bearing due to expansion of the heat exchanger or the like, rotation occurs between the POM washer and the sensor magnet since the coefficient of friction is the lowest between the POM washer and the sensor magnet, and the frictional heat generated by this rotation causes the POM washer to become deformed to reset the distance between the bearing and the sensor magnet to the original setting, thereby making it possible to maintain the position of the rotating shaft in the direction of the axis.

Furthermore, according to the present invention, the sensor magnet, which is mounted at the lower end of the rotating shaft, is secured to the lower end of the rotating shaft with a push nut.

This prevents the sensor magnet from slipping and thus, the misalignment of the rotating shaft in the direction of the axis caused by slippage of the sensor magnet is prevented.

What is claimed is:

1. A brushless motor comprising:

a stator including a stator core and coil winding portions, said stator core having a through hole formed therein;

an upper bearing and a lower bearing;

an upper bearing holder mounted in said through hole of said stator core, having at least one oil passage hole formed therein and holding said upper bearing;

a lower bearing holder mounted in said through hole of said stator core and holding said lower bearing, said lower bearing holder having at least one oil passage hole formed therein in fluid communication with said at least one oil passage hole of said upper bearing holder;

a rotary shaft rotatably held by said upper bearing and said lower bearing;

a rotor secured to said rotary shaft and including permanent magnets provided along a rotary direction;

an upper bearing stopper, provided between said upper bearing and said upper bearing holder, securing said upper bearing to said upper bearing holder, said upper bearing stopper having at least one oil passage hole formed therethrough;

a first felt located under said at least one oil passage hole of said upper bearing stopper and contacting said upper bearing;

a lower bearing stopper, provided between said lower bearing and said lower bearing holder, securing said lower bearing to said lower bearing holder;

a second felt located under said at least one oil passage hole of said lower bearing holder and contacting said lower bearing; and a thrust stopper for axially supporting said rotor, said thrust stopper having a through hole with said rotary shaft mounted therethrough and including a cylindrical portion surrounding said through hole, an oil guide being constituted by a lower surface of said cylindrical portion.

2. A brushless motor according to claim 1, wherein said rotor further includes a hub portion secured to an upper portion of said rotary shaft, an umbrella portion spreading radially from said hub portion and a cylindrical portion extending in an axial direction from an outermost edge of said umbrella portion.

3. A brushless motor according to claim 2, wherein said thrust stopper further includes a disk plate portion spreading radially from an upper end of said cylindrical portion, and a circumferential wall extending downwardly from an outer circumferential edge of said disk plate portion.

4. A brushless motor according to claim 3, further comprising a case housing;

leg portions securing said case housing to said stator;

excitation coils wound on said coil winding portions of said stator; and a control circuit board mounted in said case housing and having an excitation circuit operably connected to said excitation coils.

5. A brushless motor according to claim 4, wherein said control circuit board has a hole through which said rotary shaft extends; and said rotary shaft is provided with a sensor magnet adjacent said control circuit board.

6. A brushless motor according to claim 5, further comprising leg members securing said stator to said case housing via elastic members.

7. A brushless motor according to claim 6, wherein a lower end of said cylindrical portion of said thrust stopper projects into an upper opening of said upper bearing holder by a given distance.

8. A brushless motor according to claim 7, wherein a distance h between a lower end of said cylindrical portion of said rotor and said case housing satisfies: $1.5 \text{ mm} \leq h \leq 8.0 \text{ mm}$.

9. A brushless motor according to claim 8, further comprising a washer group located between said sensor magnet and said lower bearing, said washer group comprising first washers constituted of synthetic resin, a second washer constituted of synthetic rubber, and a third washer constituted of polyoxymethylene, arranged in series from said lower bearing to said sensor magnet.

10. A brushless motor according to claim 9, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

11. A brushless motor according to claim 6, wherein a distance h between a lower end of said cylindrical portion of said rotor and said case housing satisfies: 1.5 mm≦h≦8.0 mm.

12. A brushless motor according to claim 11, further comprising a washer group located between said sensor magnet and said lower bearing, said washer group comprising first washers constituted of synthetic resin, a second washer constituted of synthetic rubber, and a third washer constituted of polyoxymethylene, arranged in series from said lower bearing to said sensor magnet.

13. A brushless motor according to claim 12, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

14. A brushless motor according to claim 11, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

15. A brushless motor according to claim 6, further comprising a washer group located between said sensor magnet and said lower bearing, said washer group comprising first washers constituted of synthetic resin, a second washer constituted of synthetic rubber, and a third washer constituted of polyoxymethylene, arranged in series from said lower bearing to said sensor magnet.

16. A brushless motor according to claim 15, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

17. A brushless motor according to claim 6, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

18. A brushless motor according to claim 1, wherein a lower end of said cylindrical portion of said thrust stopper projects into an upper opening of said upper bearing holder by a given distance.

19. A brushless motor according to claim 1, wherein said thrust stopper further includes a disk plate portion spreading radially from an upper end of said cylindrical portion, and a circumferential wall extending downwardly from an outer circumferential edge of said disk plate portion.

20. A brushless motor according to claim 1, further comprising a case housing;

leg portions securing said case housing to said stator;

excitation coils wound on said coil winding portions of said stator; and a control circuit board mounted in said case housing and having an excitation circuit operably connected to said excitation coils.

21. A brushless motor according to claim 20, wherein said control circuit board has a hole through which said rotary shaft extends; and said rotary shaft is provided with a sensor magnet adjacent said control circuit board.

22. A brushless motor according to claim 21, further comprising leg members securing said stator to said case housing via elastic members.

23. A brushless motor according to claim 22, wherein a lower end of said cylindrical portion of said thrust stopper projects into an upper opening of said upper bearing holder by a given distance.

24. A brushless motor according to claim 22, wherein a distance h between a lower end of said cylindrical portion of said rotor and said case housing satisfies: 1.5 mm≦h≦8.0 mm.

25. A brushless motor according to claim 22, further comprising a washer group located between said sensor magnet and said lower bearing, said washer group comprising first washers constituted of synthetic resin, a second washer constituted of synthetic rubber, and a third washer constituted of polyoxymethylene, arranged in series from said lower bearing to said sensor magnet.

26. A brushless motor according to claim 22, wherein said sensor magnet comprises a cylindrical portion in which a through hole is formed and a flange portion spreading radially from an end of said cylindrical portion, said rotating shaft being inserted into said through hole of said cylindrical portion and a nut being engaged with a lower end of said rotating shaft so that said sensor magnet is mounted to said rotating shaft.

* * * * *